Patented Aug. 6, 1940

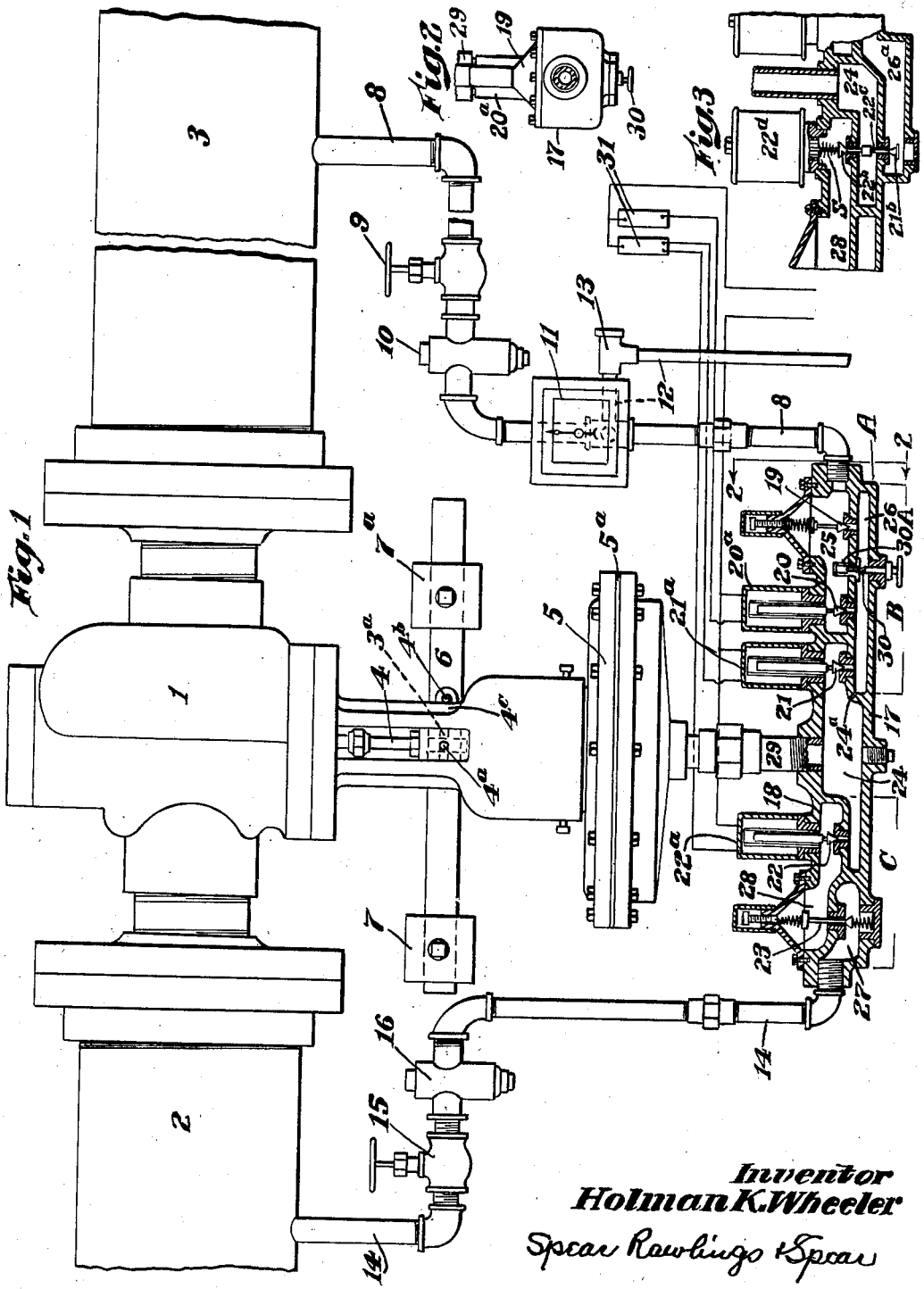

2,210,646

UNITED STATES PATENT OFFICE 2,210,646

STEAM PRESSURE CONTROL

Holman K. Wheeler, Cambridge, Mass., assignor of one-third to Richard E. Jeffrey, Brookline, Mass., and one-third to George N. Meserve, Brighton, Mass.

Application March 13, 1937, Serial No. 130,752

10 Claims. (Cl. 236—80)

My present invention relates to an automatic control of steam pressures in heating systems whereby a predetermined temperature may be maintained, for example, in a room served by the heating system, and is a development of the invention set forth in my pending application Serial No. 62,945, filed Feb. 8, 1936.

In commercial form, my automatic control is a simple, compact apparatus capable of ready installation in connection with the standard pressure reducing valve of the usual steam heating system. Frequently a diaphragm for the reducing valve is already provided and regardless of the location of the reducing valve, my control apparatus may be located where desired in any part of the building to be heated.

In accordance with my invention, I utilize as a basis of control a diaphragm actuated arm which may be balanced by a predetermined selected low side pressure delivered to the diaphragm by a valve controlled conduit. That is, when the balance is effected, the reducing valve is opened to admit a predetermined pressure to the low pressure side and to the diaphragm. This valve is thermostatically controlled and when closed the delivery conduit is controlled by a relief valve requiring for its operation a predetermined low side pressure higher than that provided when the thermostatically controlled valve is in control. The relief valve admits to the diaphragm a pressure, however, less than that resulting from the use of said first valve, establishing a high pressure in the low pressure side, so that I am able to provide, for example, low side pressures of either pounds or ounces, while the pressures actuating the diaphragm to secure these contrasted pressures are always in ounces, the lower diaphragm pressures resulting when relatively high pressures are required in the low pressure side.

In the accompanying drawing I have illustrated an embodiment of my invention as applied to a standard heating system. In the drawing:

Fig. 1 is an elevation, partly in section, of my pressure control apparatus mounted in operative relation to the pressure reducing valve of a usual steam heating system, Fig. 2 is an end view of the valve assembly, and Fig. 3 is a fragmentary partly sectioned view of a modified form of valve assembly.

A typical heating system includes a reducing valve 1 dividing the system into a high pressure side 2 and a low pressure side 3.

The stem 4 of the reducing valve 1 is under the influence of a standard type of diaphragm indicated at 5ª in its casing 5.

At 6 I have shown a lever which is slotted as at 3ª which slot receives the pivot 4ª on the valve stem 4 and the pivot 4ᵇ on the frame 4ᶜ, and which lever 6 is counterweighted as at 7 and 7ª. The weights 7 and 7ª are slidably mounted on the lever 6 and may be adjusted so that the lever will balance when any selected pressure is exerted against the lower or operating surface of the diaphragm, thereby maintaining the reducing valve in position to deliver that pressure. The lever 6 may be connected to operate dampers and the like if so desired.

A pipe line 8, tapped to the low pressure side 3, includes a manually operable valve 9, a strainer 10, and a pressure gauge 11, below which I locate an exhaust line 12, which, as hereinafter described, serves to drain excess condensate and to prevent said condensate from affecting gauge readings. The exhaust line 12 includes a valve 13 of thermostatic type adapted to be closed by steam temperatures and opened by water temperatures.

A pipe line 14 is tapped into the high pressure side 2 and includes a manually operable valve 15 and a strainer 16.

At A, I have shown a valve casing which may be cast in two sections 17 and 18, which sections when placed together may be tapped to receive the valves 19, 20, 21, 22, and 23. The valve casing A, when assembled, may be best described with reference to the outlet chamber 24 which divides the casing A into sections indicated as at B and C.

The section B includes the compartment 25 with which the low pressure line 8 communicates. The compartment 26 is connected to the compartment 25 by the valves 19 and 20 and to the compartment 24 by the valve 21 and by a needle vent 24ª. The section C of the assembled valve casing A consists of the compartment or chamber 27 into which the line 14 enters, and the compartment 28 is connected thereto by the pressure valve 23, while the compartment 28 is connected to the compartment 24 by the valve 22.

The chamber or compartment 24 is connected to the lower surface of the diaphragm 5ª by the outlet 29. Between the compartments 25 and 26, I place a needle valve 30 adapted as hereinafter explained to permit the flow of condensate from the compartment 24 to the compartment 25, when the valves 19 and 20 are closed, to be retarded as desired.

The valve 19 is a pressure operated relief valve which may be adjusted to open at any selected pressure, while the valves 20, 21 and 22 are under the control of solenoids 20ª, 21ª and 22ª. At 31 I have indicated a double thermostat adapted when a predetermined temperature is attained, to actuate the solenoid 20ª, or, if an excess temperature is reached, to operate the solenoids 21ª and 22ª.

The valves 19, 20, 21, 22 and 23 require some additional description for a complete understanding of my invention. The valve 19 is similar to a standard pressure valve except that the valve seat and the valve are formed so that the valve as it moves from its seat offers a restricted passage and acts as a relief valve.

The valves 20, 21 and 22 are standard in function although general similarity of the size of all valves and valve seats is desired as an aid to this assembly and the formation of the valve casing A.

The valve 23 is a pressure reducing valve to be closed more tightly by pressures in excess of the predetermined pressure.

The valve 30 restricting the flow of condensate from the compartment 26 to the chamber 25 includes a check valve indicated as at 30ª which prevents pressures from passing therethrough from the chamber 25 to the compartment 26.

It will be noted that if the electricity fails all the solenoid operated valves will be closed. As, however, the valve 19 is operated by a predetermined pressure it is not affected by current failure, and pressures may enter the chamber 24 through the needle vent 24ª as determined by the valve 19 which is effective to maintain in the low pressure side 3 of the heating system the maximum pressure desired.

An illustrative example of the operation of my invention will assist in an understanding of the structure which I have described.

It may be assumed that it is desired to maintain a temperature of 72° in a room served by the heating system and that the temperature therein is less than that predetermined temperature for which the thermostat 31 has been set.

While any steam pressure may exist in the system on its high pressure side 2, the low pressure side 3, because of the reducing valve 1, is adapted to function at substantially decreased pressures. In my system I contemplate the use of low pressures for purposes of establishing the desired temperature, while to maintain this desired temperature, I utilize substantially lower pressures. As a specific example, it may be assumed that the low pressure utilized for heating is three pounds, while that used for temperature maintenance is six ounces.

It will be assumed that the weights 7 and 7ª in control of the lever 6 have been so adjusted that when balanced the pressure valve 1 will be open to admit six ounces of pressure to the low pressure side 3. That is, when a six ounce pressure is exerted against the diaphragm 5, the weighted arm 6 will balance and the reducing valve 1 will be opened to admit that pressure to the low pressure side 3.

Under the assumed conditions, the valve 20 is closed, the valve 21 is open and the valve 22 is closed. As no pressure exists on the diaphragm 5 to close the valve 1, the weighted lever 6 is in control of the reducing valve 1 and opens the same to admit pressure to the low pressure line 3. The pressure operated relief valve 19 has been initially adjusted to open at a predetermined pressure which may be stated as the maximum operating pressure of the low pressure side 3, on the example given, three pounds. During this phase of operation such pressure exists in the low side 3 that the relief valve 19 is opened admitting pressure through the pipe line 9 to the compartments 25, 26, and through the compartment 24 and the outlet 29 to the pressure or lower side of the diaphragm.

Since the valve 19 is opened by a predetermined pressure, and since it also acts as a relief valve, the pressures in excess of those required to open the valve 19, affect the diaphragm 5ª and the reducing valve 1. As the weighted lever 6 has been initially adjusted to balance when the pressure on the diaphragm is six ounces and to position the reducing valve to admit six ounces of pressure to the low pressure side 3, it will be appreciated that as the excess pressure admitted to the diaphragm 5ª by the valve 19 approaches six ounces, the reducing valve 1 will decrease the pressure on the low side 3 below that required to operate the pressure valve 19. Similarly, if no pressure is exerted against the diaphragm 5ª, the reducing valve 1 opens wide. The result in operation, however, is that a pressure is maintained in the low pressure side 3 adequate to operate the valve 19 to admit pressure to the diaphragm 5ª sufficient to position the reducing valve 1 so that this three pound low side pressure is established and maintained. That is, by the use of the relief valve 19, the pressure measurable by the gauge 11 in terms of pounds of pressure is reduced to ounces when utilized to position the reducing valve 1 so that I am able to establish and maintain a relatively high pressure in the low pressure side 3 with a relatively low pressure on the diaphragm 5ª, which pressure on the diaphragm is lower than that established and maintained when the valve 20 is opened.

When the temperature in the room has been raised sufficiently to meet the requirements of the thermostat, the three-way thermostat 31 closes the circuit to the solenoid 20ª for the valve 20 to open said valve and full line pressure is now exerted against the diaphragm.

It will be noted that the pressures that I now desire to use are materially lower than those that I have used in establishing the desired temperature. When the valve 20 is open, the counterweighted arm 6 establishes a balance between the reducing valve 1 and the low pressure side 3 effective to establish and maintain the desired six ounce pressure on the diaphragm 5 for which the weights 7, 7ª have been set. That is, as any pressure in excess of six ounces closes the reducing valve 1, so that less than six ounces is admitted to the low pressure side 3, and as any pressure less than six ounces opens the reducing valve 1 so that the pressure in the low pressure side 3 is increased, the six ounce pressure against the diaphragm 5 results in the reducing valve 1 being positioned to admit six ounces of pressure to the low pressure side 3.

Assuming now that the temperature in the room rises above 72°, the thermostat 31 opens the circuit to the solenoids 21ª to close the valve 21 and closes the circuits to the solenoid 22ª, to open the valve 22 and to close the valve 21. Steam is now admitted through the line 14 to the reducing valve 23, and as the valve 22 is now open, steam at a reduced pressure is admitted to the diaphragm 5 under a pressure adequate to close the reducing valve 1.

When the temperature in the room drops below 72° the thermostats 31 are influenced to reverse the circuits, and as a result the valve 21 is opened and the valve 22 is closed. As the pressure on the diaphragm 5a diminishes, the valve 1 reopens, and pressure begins to build up again in the lines 3 and 8, until the pressure in excess of the three pounds necessary to operate the relief valve 19 is reached. Or, in the event that the temperature of 72° is restored before such pressure of three pounds is reached, the thermostat opens the valve 20, and the full line pressure is available to influence the diaphragm, and finally is stabilized to hold the main valve 1 open to deliver six ounces of pressure to the low pressure side 3 and to the diaphragm 5a.

It will be appreciated that a quantity of condensate will always be in the system and that before the cycle of operation may again take place the pressures against the diaphragm must be relieved. For this purpose I have used an adjustable needle valve 30 between the compartments 24 and 25, which with the vent 24a is effective to permit a slow leakage of the condensate to relieve pressure against the diaphragm 5a so that the reducing valve 1 is opened slowly, building up pressure slowly in the low pressure side 3. This condensate flows through the pipe line 8 through the outlet 12. Thus at all times I have a head of condensate in the system which exerts a pressure on the diaphragm 5a but which may be readily compensated for during initial adjustment. The extent to which this condensate cooperates in preventing fluctuations in the pressures during different phases of operation of my invention is not certain, but I believe that the condensate does have utility beyond protecting the diaphragm from steam temperatures. It will be noted that the valve 13 as previously stated is opened by condensate temperatures.

One phase of the operation of my apparatus may be noted in connection with the drainage of the condensate from the system and that is the relief of pressures on the diaphragm.

Assuming that there is no steam in the low pressure side 3 and the heating requirements are such that the valve 20 is not opened, pressure then builds up in the low pressure side 3 until the valve 19 becomes effective to limit the pressure as desired, say three pounds. As stated, this actually involves a pressure on the diaphragm of less than six ounces.

When the heating requirements may be satisfied by the extreme low pressure (say six ounces) in the low pressure side, the valve 20 is opened and, as above stated, this results in an increase in the pressure on the diaphragm so that the pressure on the diaphragm is the same as the pressure in the low pressure side 3.

When, however, the temperature requirements are such that a decrease in pressure on the diaphragm is necessary, it is necessary to note that in practice condensate is always present. If, for example, a pressure of three pounds instead of six ounces is necessary for heating, the valve 20 closes and pressure of six ounces remains on the diaphragm until relieved sufficiently to permit the reducing valve 1 to open wider. As the same situation is presented after the reducing valve 1 has been closed, a discussion of the pressures, in the given example, will illustrate this phase of the operation of my invention.

Because the heating requirements are such as to require an increased pressure in the low pressure side 3, less than six ounces of steam pressure actually are exerted against the diaphragm and accordingly the entrapped condensate under pressure can flow through the jet 24a, the valve 30, until the pressure on the diaphragm is relieved sufficiently to permit desired operation. As above stated, the valve 13 in the drain 12 is opened by condensate to maintain the condensate at a desired level and when opened relieves pressures.

In Fig. 3 I have shown a modified form of my invention in which the compartment 26a is formed to extend under the chamber 24 and the compartment 28. Aligned valve seats are provided so that the valves 21b and 22b may be carried by the same stem 22c adapted to be raised by the solenoid 22d when the thermostat closes the current thereto as when maximum temperatures are attained and it is desired to close the passage of pressure from the low pressure side 3 to the diaphragm 5a.

It will be noted that under the influence of the solenoid 22d and the valve 21b is closed and the valve 22b is opened admitting pressures to the diaphragm 5a from the high pressure side 2 to close the reducing valve 1.

When the temperature drops sufficiently so that the thermostat opens the circuit to the solenoid 22d, or if the power should fail, the position of the valves 21b and 22b is reversed, that is, the valve 22b is now closed and the valve 21b is now opened. If the power has failed, my apparatus will operate with the three pound pressure maintained in the low pressure side 3. If the power has not failed, the device will operate as above explained.

It will be noted that a spring S is utilized to ensure the positive positioning of the valves 21b and 22b.

In this embodiment of my invention, one solenoid is eliminated and a two way thermostat (not shown) may be substituted for the three-way thermostat 31.

A summary of the operation of my invention may be most readily effected by assuming that the valve 21 is open and the valve 22 closed so that pressures from the low side pressure 3 may affect the diaphragm. It is to be noted that the lever 6 is weighted so that, for example, a six ounce pressure on the diaphragm maintains the reducing valve 1 in a position to admit six ounces of pressure to the low pressure side 3 and to the diaphragm.

A lower pressure on the diaphragm will result in a repositioning of the reducing valve 1 to effect a correspondingly increased pressure in the low pressure side 3. For that reason I have provided a pressure operable reducing valve 19 which is effective to reduce a pressure, for example, of three pounds to a desired pressure less than six ounces to act against the weighted diaphragm to position the reducing valve 1 to admit the said three pounds pressure to the low pressure side 3.

By opening the valve 20 as where a desired temperature is reached, the low side pressure is directly available to act on the diaphragm and a balance at six ounces is effected.

As the opening and closing of the valve 20 is thermostatically effected, at a desired temperature, the pipe line pressure may be varied from the pressure in pounds used initially to raise the temperature to a pressure in ounces used for temperature maintenance.

If the temperature increases beyond a maximum, the valve 21 is closed and the valve 22 is opened admitting pressures from the high pressure side 2 to the diaphragm to close the reducing valve 1.

It will be appreciated that the valve casing A may be omitted and separate valves used, although the embodiment of my invention shown and illustrated is preferred as my apparatus is thereby simplified and its resulting compactness adds to its economy in manufacture, assembly, and in installation, as well as to its utility.

What I therefore claim and desire to secure by Letters Patent is:

1. In an automatic pressure controlled steam heating system having a main line in which a main reducing valve defines high and low pressure sides thereof, counterweighted means operable by pressure too actuate said main reducing valve, a delivery conduit from said low pressure side to said pressure operable means, valve means in control of said delivery conduit, said valve means including a first valve adapted to admit low side pressures to said pressure operable means to establish a predetermined pressure in said low pressure side and a second valve adapted to establish a regulated decrease in pressure on said pressure operable means on an increase in low side pressure when said first valve is closed to maintain a predetermined increase in pressure in said low pressure side, and thermostatically controlled means to operate said first valve.

2. In an automatic pressure controlled steam heating system having a main line in which a main reducing valve defines high and low pressure sides thereof, adjustable counterweighted means operable by pressure to actuate said main reducing valve, a delivery conduit from said low pressure side to said pressure operable means, valve means in control of said delivery conduit, said valve means including a first valve adapted to admit low side pressures to said pressure operable means to establish a predetermined pressure in said low pressure side and an adjustable pressure operable regulating valve adapted to establish a regulated decrease in pressure on said pressure operable means on an increase in low side pressure when said first valve is closed to maintain a predetermined increase in pressure in said low pressure side, and thermostatically controlled means to operate said first valve.

3. In an automatic pressure controlled steam heating system having a main line in which a main reducing valve defines high and low pressure sides thereof, counterweighted means operable by pressure to actuate said main reducing valve, a delivery conduit from said low pressure side to said pressure operable means, valve means in control of said delivery conduit, said valve means including a first valve adapted to admit low side pressures to said pressure operable means to establish a predetermined pressure in said low pressure side and a second valve adapted to establish a regulated decrease in pressure on said pressure operable means on an increase in low side pressure when said first valve is closed to maintain a predetermined increase in pressure in said low pressure side, thermostatically controlled means to operate said first valve, and means to relieve the pressure on said pressure operable means.

4. In an automatic pressure controlled steam heating system having a main line in which a main reducing valve defines high and low pressure sides thereof, counterweighted means operable by pressure to actuate said main reducing valve, a delivery conduit from said low pressure side to said pressure operable means, valve means in control of said delivery conduit, said valve means including a first valve adapted to admit low side pressures to said pressure operable means to establish a predetermined pressure in said low pressure side and a second valve adapted to establish a regulated decrease in pressure on said pressure operable means on an increase in low side pressure when said first valve is closed to maintain a predetermined increase in pressure in said low pressure side, and thermostatically controlled means to operate said first valve, a delivery conduit from said high pressure side to said pressure operable means, valve means in control of said last-named delivery conduit, said valve means including a valve and thermostatically operated means to operate said last-named valve to close said main reducing valve at a predetermined temperature and means to relieve the pressure on said pressure operable means.

5. In an automatic pressure controlled steam heating system having a main line in which a main reducing valve defines high and low pressure sides thereof, counterweighted means operable by pressure to actuate said main reducing valve, a delivery conduit from said low pressure side to said pressure operable means, valve means in control of said delivery conduit, said valve means including a first valve adapted to admit low side pressures to said pressure operable means to establish a predetermined pressure in said low pressure side and a second valve adapted to establish a regulated decrease in pressure on said pressure operable means on an increase in low side pressure when said first valve is closed to maintain a predetermined increase in pressure in said low pressure side, said second valve comprising a pressure operable regulating valve, and thermostatically controlled means to operate said first valve, a delivery conduit from said high pressure side to said pressure operable means, valve means in control of said last-named delivery conduit, said valve means including a pressure operable reducing valve and a second valve and thermostatically operated means to operate said second valve to close said main reducing valve at a predetermined temperature, and means to relieve the pressure on said pressure operable means.

6. In an automatic pressure controlled steam heating system having a main line in which a reducing valve defines high and low pressure sides thereof, counterweighted means operable by pressure to actuate said main reducing valve, a delivery conduit from said low pressure side to said pressure operable means, a delivery conduit from said high pressure side to said pressure operable means, a shut off valve in each of said conduits, thermostatically controlled means to actuate said valves so that when one of said valves is closed, the other of said valves is open, and valve means in said first-named delivery conduit, said valve means comprising a first valve adapted to admit low side pressures to said pressure operable means, thermostatically operated means to actuate said valve, and a pressure operable regulating valve operable when said first valve is closed by an increase in low side pressure to establish a lower pressure on said pressure operable means than said pressure operable means permits when said first valve in said valve means is open.

7. In an automatic pressure controlled steam heating system having a main line in which a reducing valve defines high and low pressure sides thereof, counterweighted means operable by pressure to actuate said main reducing valve, a delivery conduit from said low pressure side to said pressure operable means, a delivery conduit from said high pressure side to said pressure operable means, a shut off valve in each of said conduits, thermostatically controlled means to actuate said valves so that when one of said valves is closed, the other of said valves is open, valve means in said first-named delivery conduit, said valve means comprising a first valve adapted to admit low side pressures to said pressure operable means, thermostatically operated means to actuate said valve, and a pressure operable regulating valve operable when said first valve in said valve means is closed by an increase in low side pressure to establish a lower pressure on said pressure operable means than said pressure operable means permits when said first valve in said valve means is open, and means to relieve the pressure on said pressure operable means.

8. In an automatic pressure controlled steam heating system having a main line in which a reducing valve defines high and low pressure sides thereof, counterweighted means operable by pressure to actuate said main reducing valve, a delivery conduit from said low pressure side to said pressure operable means, a delivery conduit from said high pressure side to said pressure operable means, a shut off valve in each of said conduits, thermostatically controlled means to actuate said valves so that when one of said valves is closed, the other of said valves is open, valve means in said first-named delivery conduit, said valve means comprising a first valve adapted to admit low side pressures to said pressure operable means, thermostatically operated means to actuate said valve, and a pressure operable regulating valve operable, when said first valve in said valve means is closed, by an increase in low side pressure to establish a lower pressure on said pressure operable means than said pressure operable means permits when said first valve in said valve means is open, means to relieve the pressure on said pressure operable means and a pressure operable reducing valve in said second-named delivery conduit.

9. In an automatic pressure controlled steam heating system having a main line in which a main reducing valve defines high and low pressure sides thereof, counterweighted means operable by pressure to actuate said main reducing valve, a valve assembly comprising an outlet chamber in communication with said pressure operable means, an inlet chamber in communication with said low pressure side, a second inlet chamber in communication with said high pressure side, a compartment intermediate each of said inlet chambers and said outlet chamber, a pressure operable reducing valve between each of said inlets and each of said compartments, a valve between each of said compartments and said outlet, thermostatically operated means to open said valves automatically, a valve connecting said first-named inlet chamber to its compartment adapted to admit to said pressure operable means low side pressures and thermostatically controlled means to actuate said last-named valve.

10. In an automatic pressure controlled steam heating system having a main line in which a main reducing valve defines high and low pressure sides thereof, counterweighted means operable by pressure to actuate said main reducing valve, a valve assembly comprising an outlet chamber in communication with said pressure operable means, an inlet chamber in communication with said low pressure side, a second inlet chamber in communication with said high pressure side, a compartment intermediate each of said inlet chambers and said outlet chamber, a pressure operable reducing valve between each of said inlets and each of said compartments, a valve between each of said compartments and said outlet, thermostatically operated means to open said valves automatically, a valve connecting said first-named inlet chamber to its compartment adapted to admit to said pressure operable means low side pressures, thermostatically controlled means to actuate said last-named valve, and means to relieve pressures on said pressure operable member including a needle valve connecting said first-named inlet chamber and its compartment.

HOLMAN K. WHEELER.